(12) United States Patent
McDowell

(10) Patent No.: US 9,928,457 B2
(45) Date of Patent: Mar. 27, 2018

(54) RFID TAG AND METHOD OF SECURING SAME TO OBJECT

(71) Applicant: Haemonetics Corporation, Braintree, MA (US)

(72) Inventor: Christopher S. McDowell, Murray, UT (US)

(73) Assignee: Haemonetics Corporation, Braintree, MA (US)

( * ) Notice: Subject to any disclaimer, the term of this patent is extended or adjusted under 35 U.S.C. 154(b) by 117 days.

(21) Appl. No.: 14/896,224

(22) PCT Filed: Jun. 16, 2014

(86) PCT No.: PCT/US2014/042508
§ 371 (c)(1),
(2) Date: Dec. 4, 2015

(87) PCT Pub. No.: WO2014/204844
PCT Pub. Date: Dec. 24, 2014

(65) Prior Publication Data
US 2016/0117585 A1    Apr. 28, 2016

Related U.S. Application Data

(60) Provisional application No. 61/836,340, filed on Jun. 18, 2013.

(51) Int. Cl.
G06K 19/077        (2006.01)
G06K 19/04         (2006.01)
(Continued)

(52) U.S. Cl.
CPC ..... *G06K 19/07758* (2013.01); *B65D 25/205* (2013.01); *G06K 19/041* (2013.01);
(Continued)

(58) Field of Classification Search
CPC ............... B65D 25/205; G06K 19/041; G06K 19/07758; G06K 19/07773; G06K 2007/10504
(Continued)

(56) References Cited

U.S. PATENT DOCUMENTS 5,444,223 A    8/1995  Blama .......................... 235/435
5,777,561 A    7/1998  Chieu et al. ............. 340/825.54
(Continued)

FOREIGN PATENT DOCUMENTS

EP    1 286 775 B1    7/2006
EP    2 050 580 A2    4/2009
EP    1 946 250 B1    7/2010

OTHER PUBLICATIONS

Blaine R. Copenheaver, Authorized officer International Search Report—Application No. PCT/US2014/042508, dated Nov. 4, 2014, together with the Written Opinion of the International Searching Authority, 7 pages.
(Continued)

*Primary Examiner* — Nader Bolourchi
(74) *Attorney, Agent, or Firm* — Sunstein Kann Murphy & Timbers LLP

(57) ABSTRACT

A method for securing an RFID tag to an object includes providing an RFID tag and placing the RFID tag on the object. The RFID tag has an RFID chip and an antenna electrically connected to the RFID chip. The RFID tag also has a first and second opening extending through the RFID tag. The object has a first and second protrusion extending from a surface of the object. The first and second protrusions extend through the first and second openings when the RFID tag is placed on the object. The method also includes melting the first and second protrusions to create a single integral boss that covers at least a portion of the RFID tag and
(Continued)

secures the RFID tag to the object. The chip may be nonfunctional prior to the securement process.

37 Claims, 7 Drawing Sheets

(51) Int. Cl.
  *B65D 25/20* (2006.01)
  *G06K 7/10* (2006.01)
(52) U.S. Cl.
  CPC .............. *G06K 19/07773* (2013.01); *G06K 2007/10504* (2013.01)
(58) Field of Classification Search
  USPC ........................................................ 340/572.8
  See application file for complete search history.

(56) References Cited

U.S. PATENT DOCUMENTS

| | | | |
|---|---|---|---|
| 5,874,214 A | 2/1999 | Nova et al. ................ 435/6 |
| 5,883,582 A | 3/1999 | Bowers et al. ........ 340/825.54 |
| 6,045,652 A | 4/2000 | Tuttle et al. ............. 156/292 |
| 6,147,604 A | 11/2000 | Wiklof et al. ........... 340/572.1 |
| 6,281,795 B1 | 8/2001 | Smith et al. ............. 340/572.1 |
| 6,441,741 B1 | 8/2002 | Yoakum ................... 340/572.8 |
| 6,478,229 B1 | 11/2002 | Epstein .................... 235/492 |
| 6,483,434 B1 | 11/2002 | UmiKer ................... 340/572.1 |
| 6,520,544 B1 | 2/2003 | Mitchell et al. ............ 283/70 |
| 6,592,043 B1 | 7/2003 | Britton ..................... 235/492 |
| 6,778,089 B2 | 8/2004 | Yoakum ................... 340/572.8 |
| 6,940,408 B2 | 9/2005 | Ferguson et al. ......... 340/572.7 |
| 6,951,596 B2 * | 10/2005 | Green .............. B32B 38/0004 156/264 |
| 7,061,831 B2 | 6/2006 | De La Huerga ............ 368/10 |
| 7,070,053 B1 | 7/2006 | Abrams et al. .......... 206/459.5 |
| 7,091,864 B2 | 8/2006 | Veitch et al. ............ 340/572.8 |
| 7,102,522 B2 | 9/2006 | Kuhns ..................... 340/572.7 |
| 7,116,240 B2 | 10/2006 | Hyde ......................... 340/661 |
| 7,210,635 B2 | 5/2007 | Amstutz et al. ............ 235/492 |
| 7,212,127 B2 | 5/2007 | Jacober et al. ........... 340/572.8 |
| 7,215,251 B2 | 5/2007 | Hyde ......................... 340/661 |
| 7,224,280 B2 | 5/2007 | Ferguson et al. ......... 340/572.7 |
| 7,271,726 B2 | 9/2007 | Hollon ..................... 340/572.7 |
| 7,275,682 B2 | 10/2007 | Excoffier et al. ........... 235/375 |
| 7,350,703 B2 | 4/2008 | Ambartsoumian ......... 235/385 |
| 7,361,251 B2 | 4/2008 | Green et al. ............... 156/264 |
| 7,368,032 B2 | 5/2008 | Green et al. ............... 156/264 |
| 7,388,506 B2 | 6/2008 | Abbott ..................... 340/572.8 |
| 7,394,383 B2 | 7/2008 | Hager et al. ............. 340/572.8 |
| 7,477,150 B2 | 1/2009 | Renzetti et al. ........... 340/572.1 |
| 7,479,887 B2 | 1/2009 | Meyer ...................... 340/572.8 |
| 7,479,888 B2 | 1/2009 | Jacober et al. ........... 340/572.8 |
| 7,490,766 B2 | 2/2009 | Auchinleck .............. 235/385 |
| 7,490,767 B2 | 2/2009 | Auchinleck .............. 235/385 |
| 7,501,947 B2 | 3/2009 | Youn ....................... 340/572.1 |
| 7,528,727 B2 | 5/2009 | Morrow ................... 340/572.8 |
| 7,538,678 B2 | 5/2009 | Jung et al. ............... 340/572.1 |
| 7,541,931 B1 | 6/2009 | Freed et al. .............. 340/572.8 |
| 7,586,417 B2 | 9/2009 | Chisholm ................. 340/572.8 |
| 7,608,457 B2 | 10/2009 | Hunsley ..................... 436/70 |
| 7,609,166 B2 | 10/2009 | Forster et al. ............ 340/572.8 |
| 7,637,733 B2 | 12/2009 | O'Connell et al. .......... 425/392 |
| 7,649,463 B2 | 1/2010 | Tuttle ..................... 340/572.1 |
| 7,705,734 B2 | 4/2010 | Martinelli ................ 340/572.8 |
| 7,713,232 B2 | 5/2010 | Uber, III et al. ......... 604/93.01 |
| 7,755,484 B2 | 7/2010 | Cullen et al. ............ 340/572.1 |
| 7,755,488 B2 | 7/2010 | Dvorsky .................. 340/572.1 |
| 7,772,981 B1 | 8/2010 | Lambert et al. .......... 340/572.8 |
| 7,777,628 B2 | 8/2010 | Tilson, Jr. ............... 340/572.8 |
| 7,782,213 B2 | 8/2010 | Ohashi .................... 340/572.8 |
| 7,794,141 B2 | 9/2010 | Perry et al. ................. 374/44 |
| 7,804,405 B2 | 9/2010 | Norman et al. .......... 340/572.1 |
| 7,829,741 B2 | 11/2010 | Fukuhara et al. ............ 564/412 |
| 7,850,893 B2 | 12/2010 | Chisholm et al. ........ 264/272.11 |
| 7,859,416 B2 | 12/2010 | Tuttle ..................... 340/572.8 |
| 7,875,227 B2 | 1/2011 | Chisholm ............... 264/272.15 |
| 7,892,471 B2 | 2/2011 | Burke et al. ............... 264/241 |
| 7,922,961 B2 | 4/2011 | Chisholm et al. ........... 264/516 |
| 7,973,664 B1 | 7/2011 | Lambert et al. .......... 340/572.8 |
| 7,978,079 B2 | 7/2011 | Geissler et al. .......... 340/572.8 |
| 8,009,047 B2 | 8/2011 | Kanda et al. ............. 340/572.1 |
| 8,035,518 B2 | 10/2011 | Kolton et al. ............ 340/572.1 |
| 8,049,627 B1 | 11/2011 | Addante .................. 340/572.8 |
| 8,063,741 B2 | 11/2011 | Hioki et al. ............... 340/10.1 |
| 8,068,028 B2 | 11/2011 | Phaneuf .................. 340/572.1 |
| 8,072,333 B2 | 12/2011 | Ferguson et al. ......... 340/572.7 |
| 8,089,359 B2 | 1/2012 | Lopez et al. ............. 340/572.1 |
| 8,094,027 B2 | 1/2012 | Yang ....................... 340/572.8 |
| 8,097,199 B2 | 1/2012 | Abbott et al. ........... 264/272.15 |
| 8,098,162 B2 | 1/2012 | Abbott et al. ............ 340/572.8 |
| 8,100,585 B2 | 1/2012 | Burke et al. ................... 383/5 |
| 8,105,487 B2 | 1/2012 | Fulkerson et al. ........ 210/321.71 |
| 8,113,007 B2 | 2/2012 | Zenobi et al. ................ 62/62 |
| 8,115,636 B2 | 2/2012 | Forster .................... 340/572.3 |
| 8,120,484 B2 | 2/2012 | Chisholm ................. 340/572.1 |
| 8,120,485 B2 | 2/2012 | Yang ....................... 340/572.1 |
| 8,136,735 B2 | 3/2012 | Arai et al. .................. 235/492 |
| 8,161,910 B2 | 4/2012 | Coiro, Sr. et al. ........... 119/417 |
| 8,164,457 B2 | 4/2012 | Dunlap et al. ............. 340/572.1 |
| 8,173,057 B2 | 5/2012 | Parker et al. ............... 264/318 |
| 8,183,052 B2 | 5/2012 | Reed et al. ................. 436/172 |
| 8,212,226 B2 | 7/2012 | Chisholm ................. 250/461.1 |
| 8,212,676 B2 | 7/2012 | Cullen et al. ............ 340/572.1 |
| 8,215,518 B2 | 7/2012 | Hyde et al. ............. 220/592.26 |
| 8,215,835 B2 | 7/2012 | Hyde et al. ................. 374/208 |
| 8,231,024 B2 | 7/2012 | Sanfilippo et al. ............ 220/6 |
| 8,242,907 B2 | 8/2012 | Butler et al. ............. 340/572.1 |
| 8,242,908 B2 | 8/2012 | Moore et al. ............. 340/572.1 |
| 8,242,911 B2 | 8/2012 | Moore et al. ............. 340/572.1 |
| 8,246,773 B2 | 8/2012 | Green et al. ................. 156/265 |
| 8,248,238 B2 | 8/2012 | Butler et al. ............. 340/572.1 |
| 8,248,239 B2 | 8/2012 | Butler et al. ............. 340/572.1 |
| 8,253,567 B2 | 8/2012 | Butler et al. ............. 340/572.1 |
| 8,257,636 B2 | 9/2012 | Oconnell et al. ............. 264/339 |
| 8,267,308 B2 | 9/2012 | Devergne et al. ............ 235/375 |
| 8,267,325 B2 | 9/2012 | Phaneuf .................... 235/492 |
| 8,269,630 B2 | 9/2012 | Butler et al. ............. 340/572.1 |
| 8,269,670 B2 | 9/2012 | Sprowl et al. .......... 343/700 MS |
| 8,279,065 B2 | 10/2012 | Butler et al. ............. 340/572.1 |
| 8,284,055 B2 | 10/2012 | Butler et al. ............. 340/572.1 |
| 8,292,173 B2 | 10/2012 | Yturralde et al. ............. 235/385 |
| 8,292,594 B2 | 10/2012 | Tracey et al. ................ 417/43 |
| 8,294,579 B2 | 10/2012 | Butler et al. ............. 340/572.1 |
| 8,313,594 B2 | 11/2012 | Muirhead ..................... 156/64 |
| 8,317,099 B2 | 11/2012 | Perkins et al. ............. 235/385 |
| 8,318,499 B2 | 11/2012 | Fritchie et al. .............. 436/43 |
| 8,325,047 B2 | 12/2012 | Marur et al. ............. 340/572.8 |
| 8,330,602 B2 | 12/2012 | Ohashi et al. ............ 340/572.8 |
| 8,427,316 B2 | 4/2013 | Bielas ...................... 340/572.1 |
| 8,432,286 B2 | 4/2013 | Kolton et al. ............ 340/572.9 |
| 8,466,793 B2 | 6/2013 | Kolton et al. ............ 340/572.8 |
| 8,758,321 B2 | 6/2014 | Stacey et al. ................. 604/403 |
| 2005/0019943 A1 | 1/2005 | Chaoui et al. ............... 436/165 |
| 2005/0128087 A1* | 6/2005 | Claessens ............ G06Q 20/207 340/572.8 |
| 2007/0139202 A1* | 6/2007 | Austin .............. B29C 45/14639 340/572.8 |
| 2008/0036677 A1 | 2/2008 | Matsushita et al. .......... 343/866 |
| 2008/0117058 A1 | 5/2008 | Oberle .................... 340/572.8 |
| 2008/0122631 A1* | 5/2008 | Kodukula ............ G06K 19/0723 340/572.8 |
| 2008/0213135 A1 | 9/2008 | Burke et al. ................ 422/102 |
| 2008/0309497 A1 | 12/2008 | Bryant ..................... 340/572.8 |
| 2009/0096613 A1* | 4/2009 | Westrick ........... G06K 19/07735 340/572.7 |
| 2010/0007501 A1* | 1/2010 | Yang ...................... B01L 3/545 340/572.8 |
| 2010/0102967 A1 | 4/2010 | Lee et al. ................. 340/572.8 |
| 2010/0181382 A1 | 7/2010 | Speich .................... 235/492 |
| 2010/0243743 A1* | 9/2010 | Takeuchi ........... G06K 19/07728 235/488 |
| 2010/0253524 A1 | 10/2010 | Kolton et al. ............ 340/572.9 |

(56) References Cited

U.S. PATENT DOCUMENTS

| | | | |
|---|---|---|---|
| 2011/0031178 A1 | 2/2011 | Burke et al. | 210/251 |
| 2011/0281346 A1 | 11/2011 | Halpern et al. | 435/307.1 |
| 2012/0044054 A1* | 2/2012 | Hussain | G06K 7/10178 340/10.1 |
| 2012/0217307 A1 | 8/2012 | Martin et al. | 235/494 |
| 2013/0105586 A1* | 5/2013 | Sykko | H05K 13/00 235/492 |

OTHER PUBLICATIONS

Lingfei Bai, Authorized officer The International Bureau of WIPO International Preliminary Report on Patentability—Application No. PCT/US2014/042508, dated Dec. 8, 2015, 6 pages.

* cited by examiner

RFID TAG AND METHOD OF SECURING SAME TO OBJECT

PRIORITY

This patent application claims priority from U.S. patent application No. 61/836,340, filed Jun. 18, 2013, entitled, "RFID Tag and Method of Securing Same to Object,", and naming Christopher S. McDowell as inventor, the disclosure of which is incorporated herein, in its entirety, by reference.

TECHNICAL FIELD

The present invention relates to radio-frequency identification tags, and more particularly to methods of securing RFID tags to an object.

BACKGROUND ART

Radio frequency identification (RFID) tags are commonly used to monitor and track a variety of goods. In particular, RFID tags may be secured to and/or formed directly within (e.g., molded within) an object or a storage container. These RFID tags are then programmed with information relating to the object and/or the substance contained within the storage container. The RFID tags may then be scanned during storage and/or transport to obtain the product details.

For valuable products/objects, some individuals may have an incentive to tamper with and/or switch the RFID tag with an RFID tag from another object/container. For example, in the context of blood products, if one bottle of blood product is marked as HIV+ (and therefore is unusable), and another container of acceptable blood product breaks, an individual may be tempted to switch the RFID tag of the broken bottle of blood product with the RFID tag on the bottle marked as HIV+. As one would expect, this would create a significant health risk to a patient receiving the HIV+ blood product.

SUMMARY OF THE EMBODIMENTS

In a first embodiment of the invention there is provided a method for securing an RFID tag to an object. The RFID tag may include an RFID chip, an antenna electrically connected to the RFID chip, and a first and second opening extending through the RFID tag. The method may include placing the RFID tag on the object which, in turn, has a first and second protrusion (e.g., integral with the object) extending from the surface of the object. The first and second protrusions may extend through the first and second openings when the RFID tag is placed on the object. The method may then melt the first and second protrusions to create a single integral boss that covers at least a portion of the RFID tag and secures the RFID tag to the object. For example, melting the protrusions may include placing a heated die over the first and second protrusions.

Prior to removing the die from the boss, the method may cool the die (or allow the die to cool) so the plastic is below it melting temperature before the die is removed from the part. In some embodiments the die may include a non-stick coating that helps prevent the boss from sticking to the die. The RFID tag may also include a substrate, an adhesive layer located above the substrate, and/or a top layer secured to the substrate via the adhesive layer. The RFID chip and antenna may be located on the substrate, and the first and second openings may pass through the substrate. The top layer may cover the antenna and RFID chip. To help adhere the RFID tag to the object, the RFID tag may further include a second adhesive layer located on an underside of the substrate.

In some embodiments, the first opening may be located on a first side of the RFID chip and the second opening may be located on an opposing side of the RFID chip. In such embodiments, the boss may cover the RFID chip. Additionally or alternatively, the RFID tag may include a third and fourth opening, and the object may include a third and fourth protrusion. The third and fourth protrusions may extend through the third and fourth openings when the RFID tag is placed on the object. The method may include melting the third and fourth protrusions to create a second single integral boss that covers at least a portion of the RFID tag to secure the RFID tag to the object. For example, the second boss may cover a portion of the antenna. The RFID tag may be non-functional prior to melting the first and second protrusions (and/or the third and fourth protrusions) to create the boss(es), with the resultant electromagnetic properties of the construct enabling the tag's routine functionality.

In accordance with further embodiments, a storage container may include a body defining the structure of the storage container, and first and second protrusions extending from the surface of a part of the storage container. An RFID tag may be secured to the surface of the storage container, and may include a substrate having a first and second opening extending through it. The RFID tag may also include an RFID chip located on the substrate, and an antenna located on the substrate and electrically connected to the RFID chip. The first and second openings may be configured to receive the first and second protrusions, and the first and second protrusions may be configured to be melted to create a single integral boss covering at least a portion of the RFID tag to secure the RFID tag to the object.

In some embodiments, the first and second protrusions may be melted using a heated die that, in turn, may include a non-stick coating that helps prevent the boss from sticking to the die. The RFID tag may also include (1) an adhesive layer located on an underside of the substrate that adheres the RFID tag to the object, (2) a second adhesive layer located above the substrate, and (3) a top layer secured to the substrate via the second adhesive layer. The top layer may cover the antenna and RFID chip.

The first and second openings may be located on opposite sides of the RFID chip so that the boss covers the RFID chip when formed. Additionally or alternatively, the RFID tag may include a third and fourth opening, and the storage container may include a third and fourth protrusion extending from the surface. The third and fourth protrusions may extend through the third and fourth openings when the RFID tag is placed on the object, and may be melted to create a second single integral boss. The second boss may cover at least a portion of the RFID tag (e.g., a portion of the antenna) to further secure the RFID tag to the object. The protrusions (first, second, third and fourth) may be integral with the object, and the RFID tag may be non-functional prior to melting one or more of the protrusions to create the boss.

In accordance with further embodiments, an RFID tag may include a substrate with a pair of openings extending through it. The pair of openings may be configured to receive a pair of protrusions extending from a surface of an object to which the RFID tag is to be secured. The pair of protrusions may be configured to be melted (e.g., using a heated die) to create a single integral boss that covers at least a portion of the RFID tag and secures the RFID tag to the object. The RFID tag may also include an RFID chip and an antenna located on the substrate. The antenna may be electrically connected to the RFID chip. The die may include a non-stick coating that prevents the boss from sticking to the die.

In some embodiments, the RFID tag may include an adhesive layer located on the underside of the substrate to adhere the RFID tag to the object. Additionally or alternatively, the RFID tag may include an adhesive layer located above the substrate, and a top layer secured to the substrate via the adhesive layer. The top layer may cover the antenna and RFID chip.

The pair of openings may include a first opening and a second opening that are located on opposite sides of the RFID chip, such that the boss covers the RFID chip when formed. The RFID tag may also include a second pair of openings configured to receive a second pair of protrusions extending from the surface of the object. The second pair of protrusions may extend through the second pair of openings when the RFID tag is placed on the object, and may be melted to create a second single integral boss. The second boss may cover a portion of the RFID tag (e.g., a portion of the antenna) to further secure the RFID tag to the object. The RFID tag may be non-functional prior to melting the pair of protrusions to create the boss.

In some embodiments, the substrate may contain diecuts or weakened portions so that the substrate and antenna tear or rip upon attempted removal of the tag. For example, during attempted removal, the boss may retain a portion of the tag, causing the tensile load to be concentrated on the weakened area. Furthermore, because the tensile load on the RFID tag is greater than what the weakened area can handle, the RFID tag will tear.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

In illustrative embodiments, a radio-frequency identification (RFID) tag may have a substrate with a number of openings that receive protrusions extending from the object to which the RFID tag is to be secured. The protrusions may then be melted to create a "boss" that covers/encapsulates a portion of the RFID tag and secures the RFID tag to the object. To remove the RFID tag, the boss must be broken (or the substrate torn). In this manner, various embodiments of the present invention exhibit tamper-proof and/or tamper-evident characteristics upon attempted removal of the RFID tag from the object to which it is secured.

Figure 1:
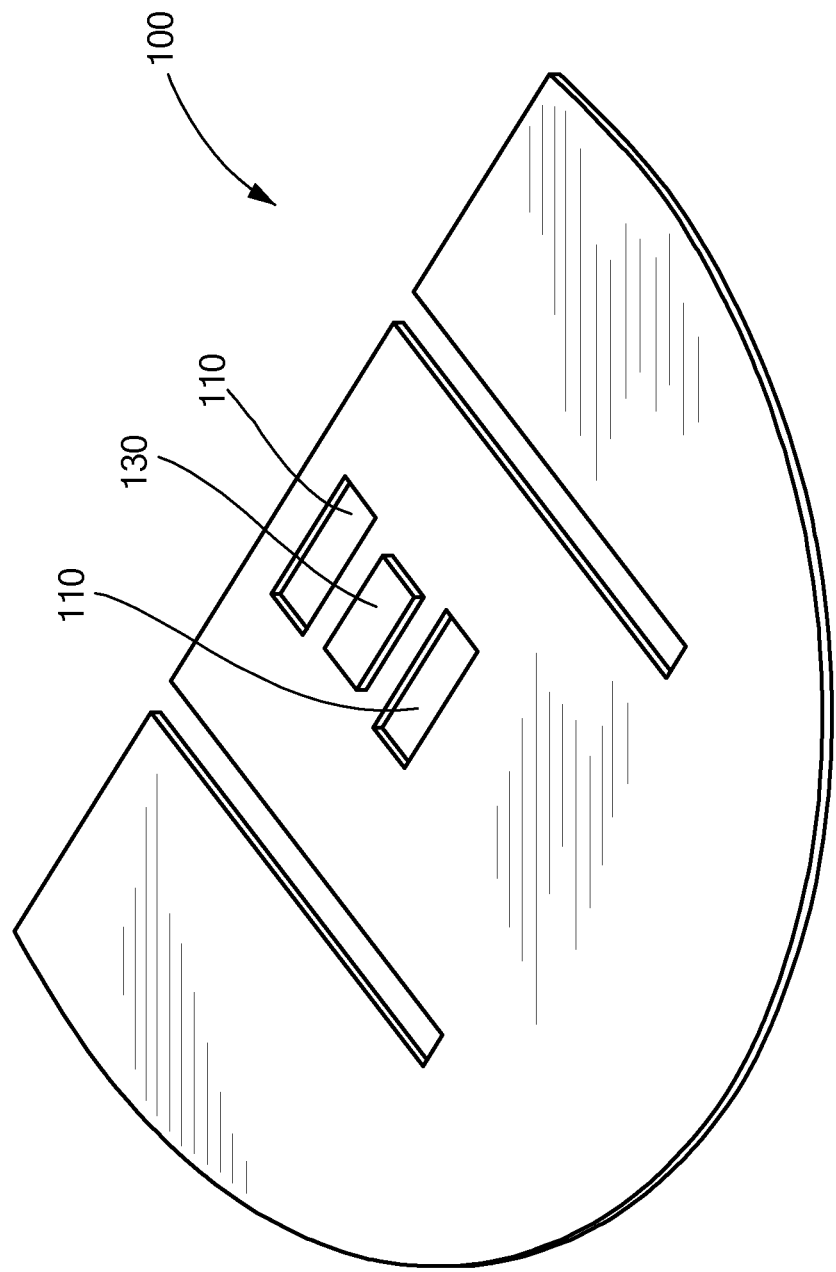
FIG. 1 is a perspective view of an RFID tag in accordance with various embodiments of the present invention.
Figure 2:
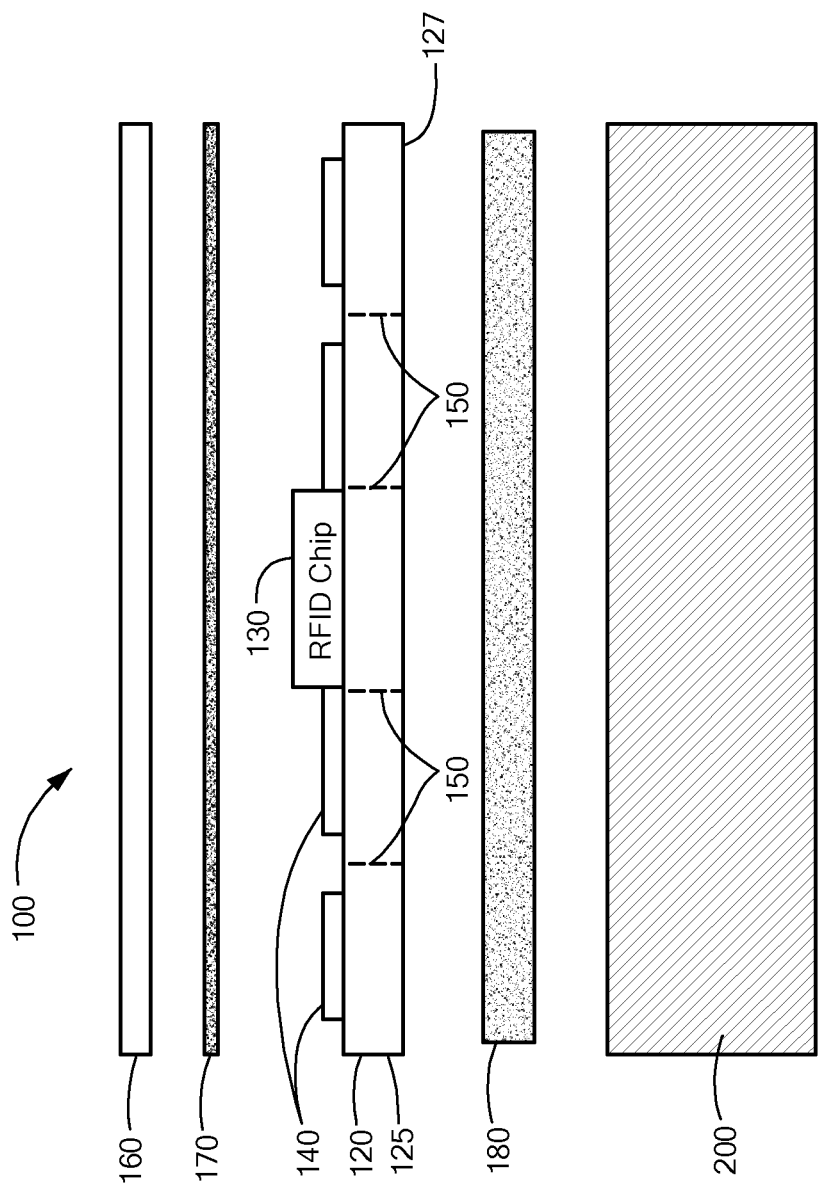
FIG. 2 is a schematic cross-sectional side view of the RFID tag shown in FIG. 1 in accordance with exemplary embodiments of the present invention.
Figure 3A:
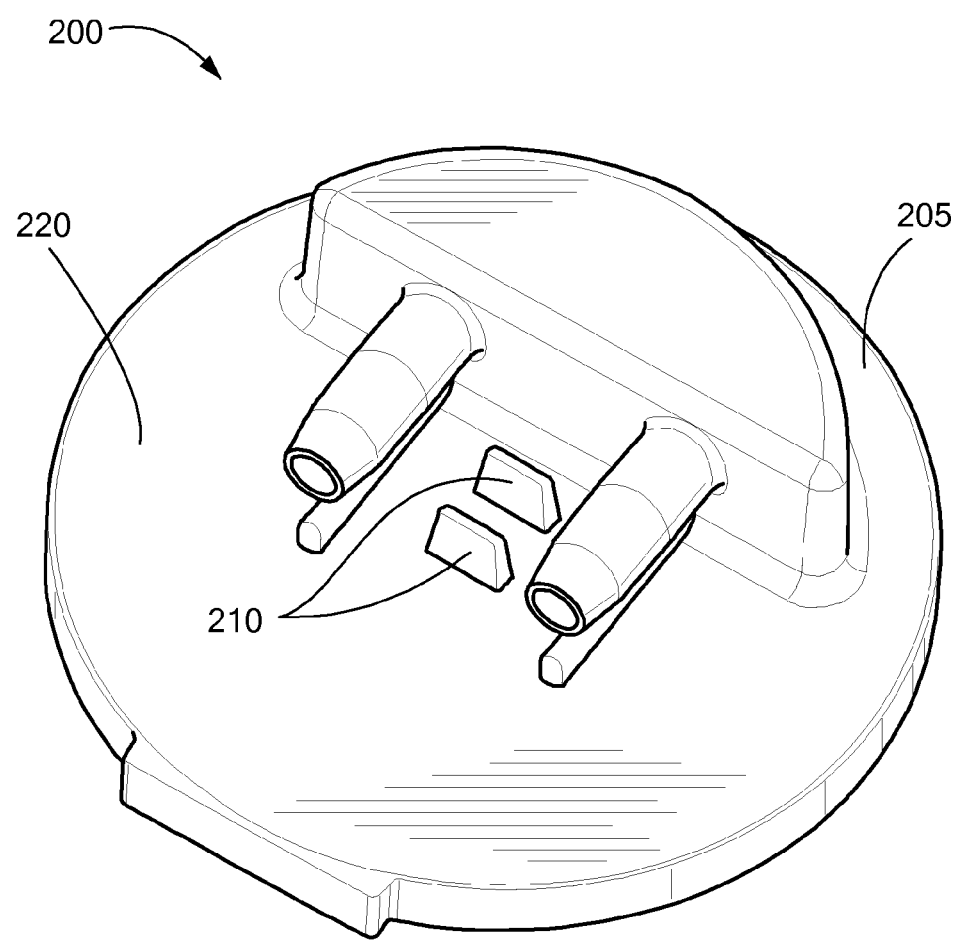
FIG. 3A is a perspective view of a portion of an object to which the RFID tag shown in FIG. 1 may be secured, in accordance with some embodiments of the present invention.
Figure 3B:
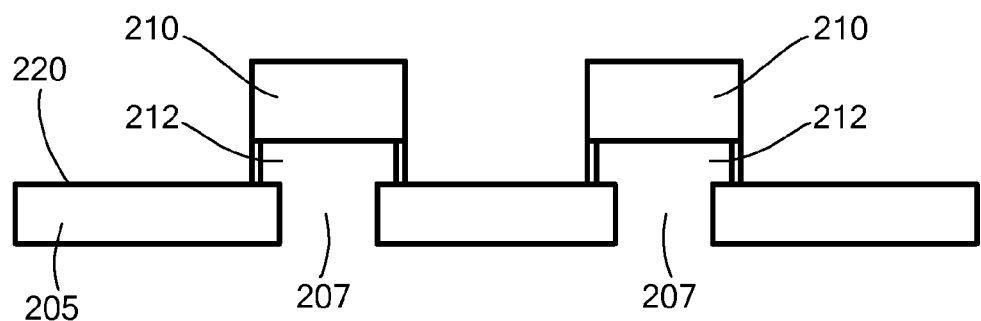
FIG. 3B is schematic cross-sectional view of an object having hollow protrusions, in accordance with some embodiments of the present invention.
Figure 3C:
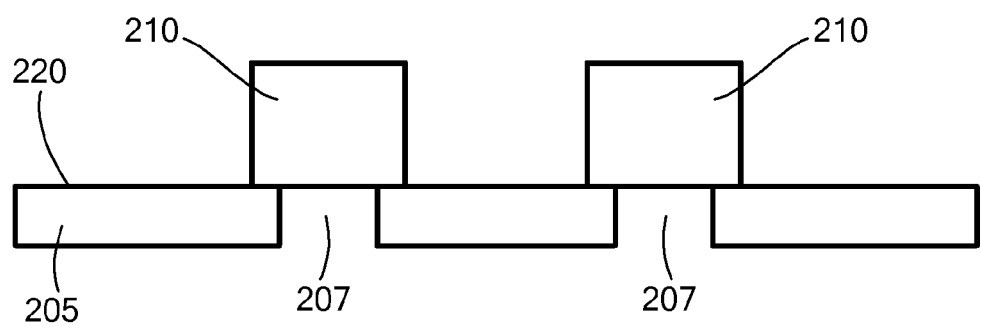
FIG. 3C is schematic cross-sectional view of an object having openings below the protrusions, in accordance with some embodiments of the present invention.

FIG. 1 schematically shows an RFID tag 100 in accordance with some embodiments of the present invention. As discussed in greater detail below, the RFID tag 100 may consist of a number of layers, including a device layer that includes an RFID chip 130 and antenna 140 (FIG. 2). Additionally, in order to facilitate the attachment of the RFID tag 100 to an object 200 (FIG. 2), the RFID tag 100 may include a number of openings 110 extending through the RFID tag 100. The openings 110 may be used in conjunction with a number of protrusions (discussed in greater detail below) extending from the object 200 to secure the RFID tag 100 to the object 200. Once secured to the object 200, the RFID tag 100 may be used to track and monitor the object 200 to which it is secured.

As mentioned above and as shown in FIG. 2, the RFID tag 100 may consist of a number of layers. For example, the RFID tag 100 may include a main, device layer 120 having a substrate 125 upon which the RFID chip 130 and antenna 140 (e.g., a copper trace antenna) may be located. Although any number of materials may be used for the substrate 125, in some embodiments, the substrate 125 may be a polyethylene terephthalate (PETG) film. Additionally, in order to protect the RFID chip 130 and antenna 140 from dust, moisture, and other contamination that may negatively impact the performance of the RFID tag 100, the RFID tag 100 may also include a top layer 160 that is secured to the device layer 120 via a layer of adhesive 170. The top layer 160 may be any number of polymers, for example, polypropylene (e.g., a polypropylene film), and, in some embodiments, may be opaque so that the RFID chip 130, and the antenna 140 are not visible through the top layer 160.

In some embodiments, the RFID tag 100 can also include a second layer of adhesive 180 on the underside 127 of the substrate 125. This second layer of adhesive 180 may be used to help secure the RFID tag 100 to the object 200 and may be used to hold the RFID tag 100 in place as the boss is created (discussed in greater detail below). To prevent the RFID tag 100 from accidentally sticking to the wrong surface, the tag 100 may include a release liner (not shown) that covers and protects the adhesive layer 180 prior to the tag 100 being secured to the object 200. In such embodiments, when the tag 100 is to be secured to the object 200, the user may simply remove the release line to expose the adhesive layer 180 and stick the RFID tag 100 to the object 200.

The adhesive layers 170/180 can be a layer of standard glue (e.g., Fasson® S333 adhesive by Avery-Dennison). Alternatively, the second adhesive layer 180 may include a stronger adhesive than that of the first adhesive layer 170 used to secure the top layer 160 to the substrate 125. For example, the second adhesive layer 180 may be a layer of high bond adhesive, for example, Very High Bond Adhesive (VHB™) from 3M™. It should be noted that using the VHB adhesive for the second adhesive layer 180 makes it more difficult for someone to remove the RFID tag 100 from the object 200.

As shown in FIGS. 3A-C and 4, to facilitate the securement of the RFID tag 100 to the object 200, the object 200 may have protrusions 210 extending from a surface 220 of the object 200. For example, if the object 200 is a blood component storage container, the protrusions 210 can extend from the cap (e.g., an inner cap 205) of the storage container. The protrusions 210 can be injection molded and integral with the object 200 (e.g., integral with the inner cap 205). The protrusions 210 can be the same material (or a different material) as the object (e.g., high-density polyethylene (HDPE)), and can be a solid structure extending from the object 200.

Alternatively, in some embodiments, the protrusions 210 can be molded from the underside of the object (e.g., from the underside of the inner cap 205 during manufacturing of the object 200). In such embodiments, the protrusions 210 may have a hollow interior 212 (FIG. 3B) and/or the object 200 (e.g., the inner cap 205) may have an opening 207 (e.g., if the object 200 has an open inner volume) or hollow area (e.g., if the object 200 is solid) (FIG. 3B) at the base of the protrusions 210. As discussed in greater detail below, in such embodiments, if someone attempts to remove the RFID tag 100 from the object by breaking the boss(es) 230, the hollow area/opening 207 will create hole(s) in/through the object 200. For example, if the object 200 is a blood component storage container, breaking the protrusions 210 will create holes through the inner cap 205 and into the interior of the blood component storage container.

Figure 4:
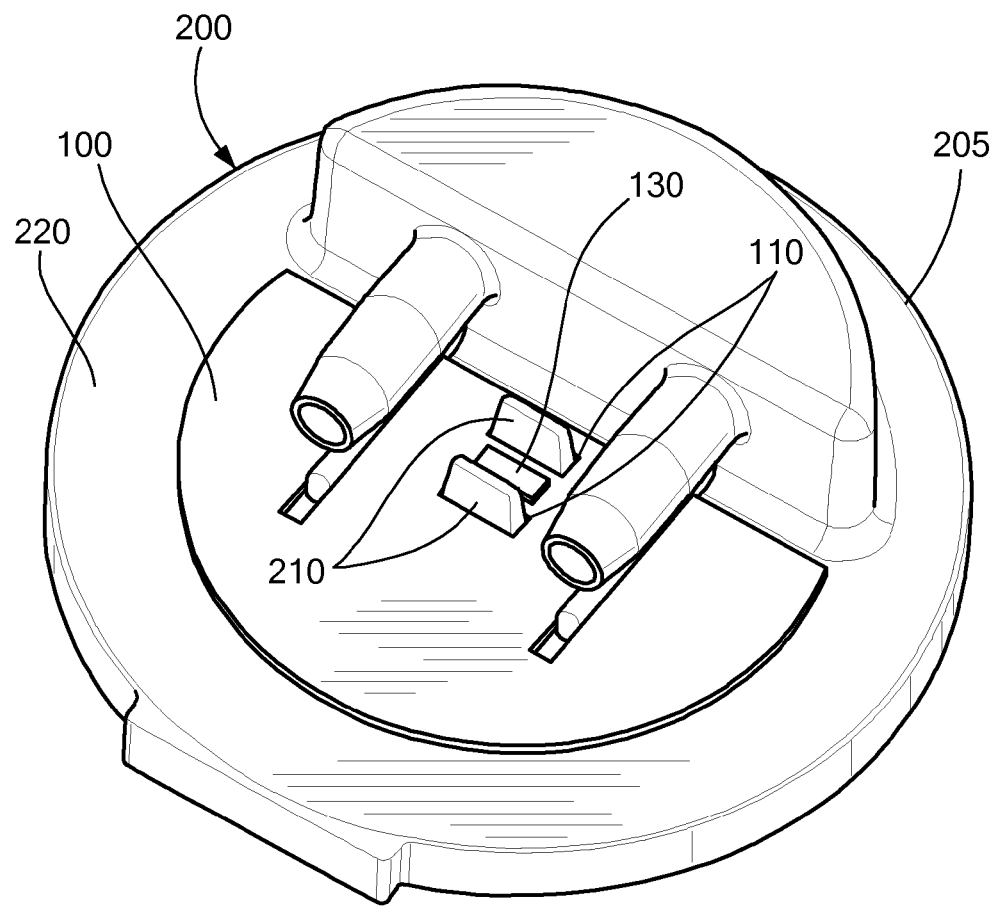
FIG. 4 schematically shows the RFID tag shown in FIG. 1 located on the object shown in FIG. 3A, in accordance with various embodiments of the present invention.

As best shown in FIG. 4, when the RFID tag 100 is placed on the object 200 (e.g., as the tag 100 is placed on the inner cap 205), the protrusions 210 can pass through the openings 110 in the substrate 125 (and the top layer 160 if the RFID tag 100 includes the top layer 160) of the RFID tag 100. As mentioned above, the protrusions 210 can be melted to form a boss 230 (FIG. 5) that, in turn, secures the RFID tag 100 to object 200. To that end, once the RFID tag 100 is in place on the object 200 and the protrusions 210 extend through the openings 110 (FIG. 4), a heated die 300 may be used to melt the protrusions 210 and form the boss 230 shown in FIG. 5.

Figure 5:
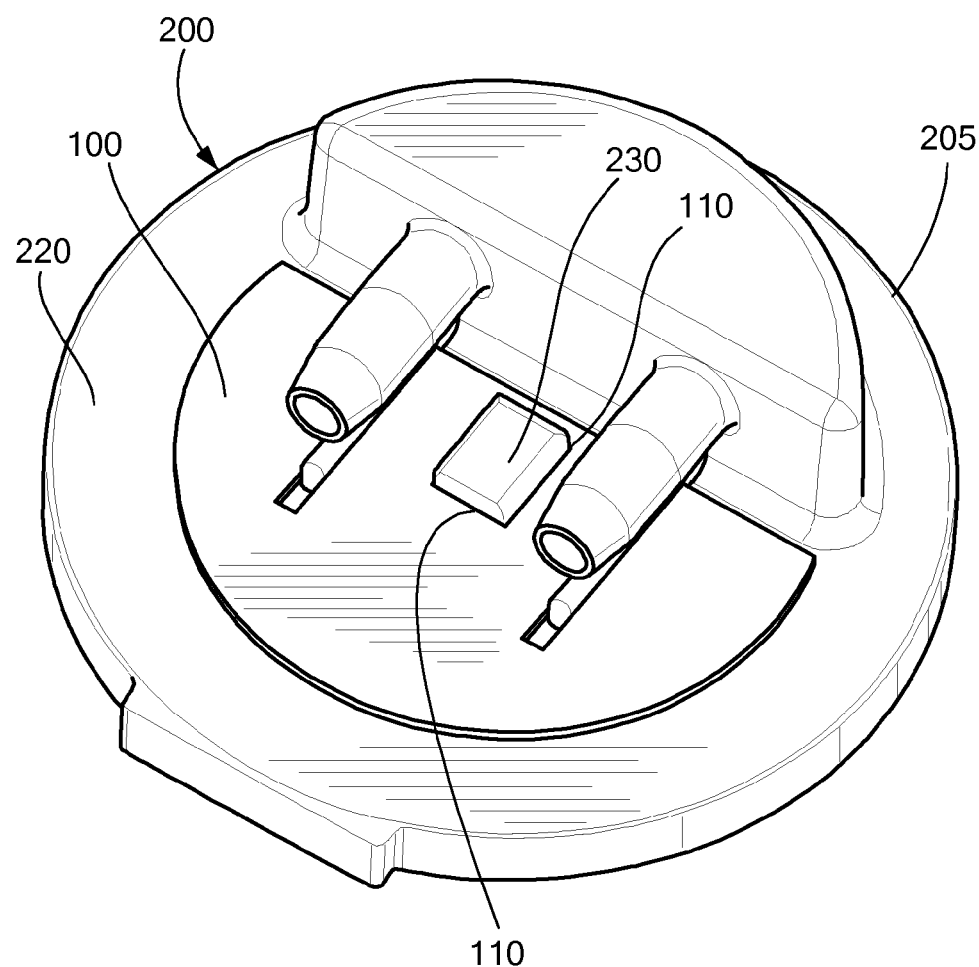
FIG. 5 schematically shows the RFID tag shown in FIG. 1 secured to the object shown in FIG. 3A, in accordance with various embodiments of the present invention.

In addition to securing the RFID tag 100 to the object 200, the boss 230 may cover and, in some embodiments, partially encapsulate a portion of the RFID tag 100. In this manner, the boss 230 can protect some of the various components of the RFID tag 100. For example, as shown in FIGS. 4 and 5, the protrusions 210 and the openings 110 can be located on either side of the RFID chip 130 such that, when the protrusions 210 are melted to form the boss 230, the boss 230 covers and protects the RFID chip 210 from damage. Although the boss 230 may cover the RFID chip 130 on all sides (except for the bottom) and partially encapsulate the RFID chip 130, depending on the materials and process used, the boss 230 may or may not bond with the substrate 125. For example, in some embodiments, there may be a small space between the boss 230 and the substrate 125, and/or there may only be some mechanical gripping between the boss 230 and the substrate 125 (e.g., there may not be a chemical bond).

Figure 6:
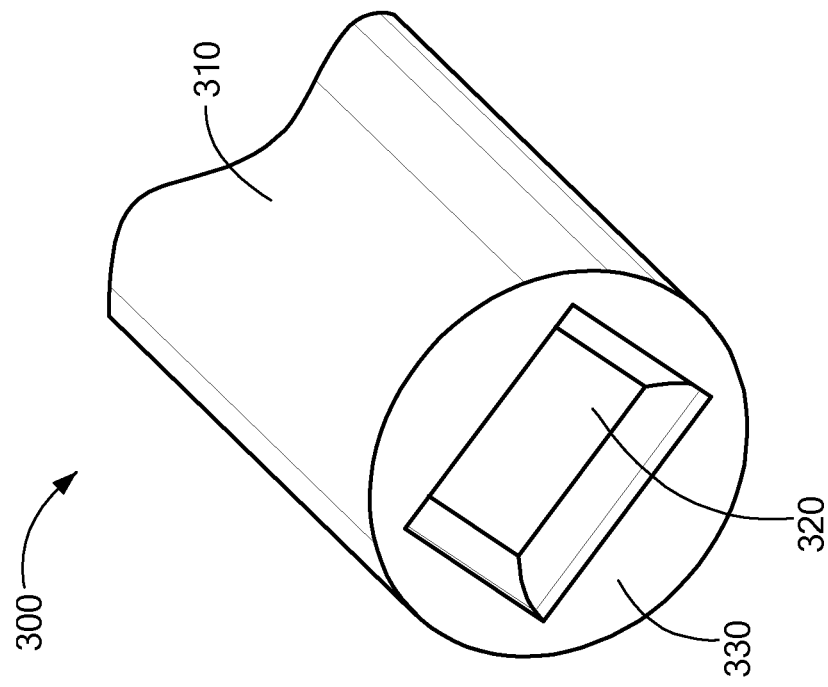
FIG. 6 is a perspective view of a die used to secure the RFID tag to the object, in accordance with various embodiments of the present invention.

FIG. 6 shows an exemplary die 300 that may be used to melt the protrusions 210 to form the boss 230. The die 300 may include a main body 310 (e.g., a cylindrical shaft) and an indentation 320 formed in the bottom surface 330 of the body 310. To minimize the time it takes to create the boss 230, it is beneficial to minimize the thermal mass of the die 300 in order to allow the temperature of the die 300 to change quickly. To that end, it is important to minimize the physical size of the die 300 and select materials that have high thermal conductivities (e.g., ferrous materials, silver-bearing alloys, or Titanium alloys). Additionally, the surface of the indentation 320 may include a non-stick coating (e.g., a Teflon or similar coating) that helps prevent the melted protrusion material and the boss 230 from sticking to the die 300.

In some embodiments, the indentation 320 within the die 300 may include a logo or similar mark that may be imprinted into the boss 230. For example the logo/mark may be the logo of the company that manufactures/produces the object 200 (or the contents thereof), branding promoting the security of the tag retention system, the date the RFID tag 100 was secured to the object 200, the initials (or other identification) of an inspector tasked with inspecting the object 200, and/or a mark indicating the type and/or contents of the object 200.

Although the size of the indentation 320 (and the protrusions 210) can vary depending on the object 200, RFID tag 100 and the application, to ensure that the boss(es) 230 are formed properly, the sizes of the indentation 320 and the protrusions should be such that the melted protrusion material is sufficient to completely fill the indentation 320. Furthermore, it is important to note that the size of the protrusions 210 and the volume of the indentation 320 determine, at least in part, the size of the boss(es) 230 created. Therefore, in applications in which more significant damage to the object 200 and RFID tag 100 is desired, larger protrusions 210 and a larger indentation 320 may be used to create larger boss(es) 230.

As discussed in greater detail below, some embodiments of the present invention may utilize an induction heater to heat the die 300 to the desired temperature (e.g., a temperature above the melting point of the protrusion material). When the protrusions 210 are fully melted, the user may shut off (or otherwise remove) the heat source and allow the die 300 to cool. During this time, the back of the die 300 (e.g., the area away from the indentation 320 will absorb the heat to cool the portion of the die 300 around/near the indentation.

Although FIGS. 1 and 3-5 show an RFID tag 100 with only a single pair of openings 110 and an object 200 with only a single pair of protrusions 210 (e.g., to create a single boss 230), it is important to note that other embodiments can have more than one pair of each. For example, in some embodiments, the RFID tag 100 can have two or more pairs of openings 100 and the object 200 can have two or more pairs of protrusions 210. In this manner, some embodiments can have/create several bosses 230 located at various locations on the RFID tag 100. In such embodiments, if a sufficient number of bosses 230 are created, the RFID tag 100 will not require the second adhesive layer 180 because the RFID tag 100 will be sufficiently pinned down/secured to the object via the bosses 230. In other words, in some embodiments, the bosses 230 may be the primary means to secure the RFID tag 100 to the object 200.

It is important to note that the location of the protrusions 210 and openings 110 (and the bosses 230) relative to the antenna 140 and the RFID chip 130 can impact the performance of the RFID tag 100. For example, the antenna 140, the top layer 160 and the substrate 125 of the RFID tag 100 essentially form a capacitor. Furthermore, the capacitance of the RFID tag 100 impacts the timing of the resistor-capacitor (RC) circuit that, in turn, is a characteristic of the UHF operation of the RFID tag 100 (e.g., the natural frequency of operation of the RFID tag 100). Additionally, if the boss 230 is formed over a portion of the antenna 130, the capacitance value of the RFID tag 100 may shift and alter the performance of the RFID tag 100. Therefore, in some embodiments, it may be desirable to locate the protrusions 210 and openings 110 away from the antenna 130 to avoid any potential interference with the performance of the antenna 130 and/or RFID tag 100.

Additionally or alternatively, some embodiments of the present invention may compensate for any shift in the capacitance value caused by the boss(es) 230. In such embodiments, the RFID tag 100 and the antenna 130 can be designed such that the RFID tag is inoperable until the bosses 230 are formed and the tag 100 is secured to the object. For example, the RFID tag 100 can be designed such that the capacitance shift created by securing the tag 100 to the object 200 and creating the bosses 230 (e.g., over a portion of the antenna 130) causes the RFID tag 100 to be operable. In this manner, some embodiments of the present invention can ensure that an RFID tag 100 will be operable only when secured to the intended object 200 and prevent a different RFID tag 100 from be secured to the object 200.

Figure 7:
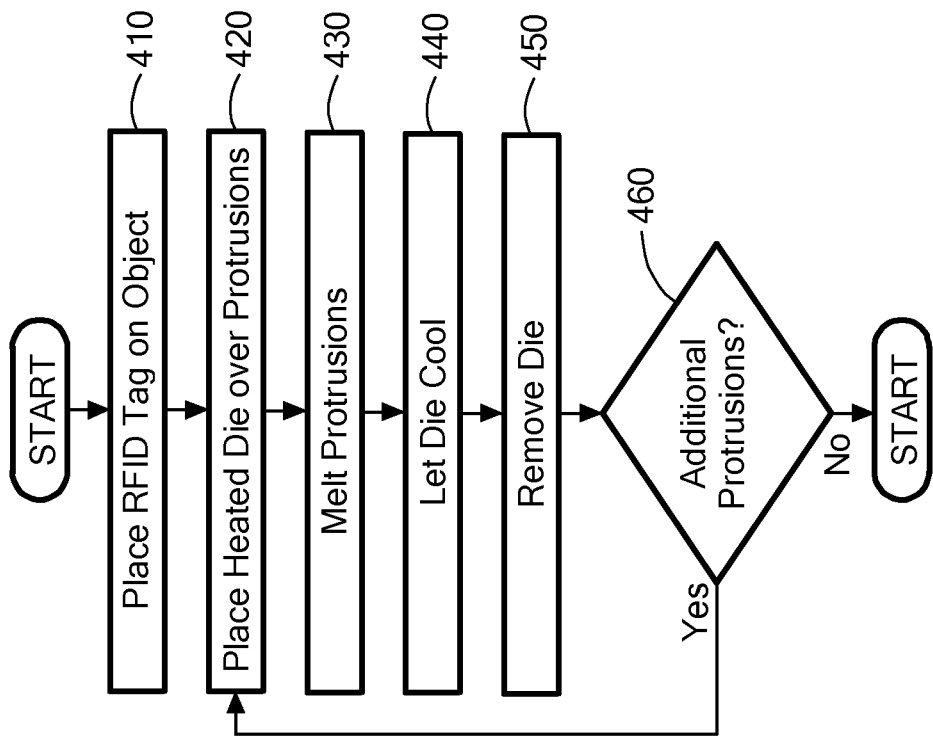
FIG. 7 is a flowchart showing a method of securing an RFID tag to an object, in accordance with illustrative embodiments of the present invention.

FIG. 7 is a flowchart depicting a method for securing an RFID tag 100 to an object 200 in accordance with some embodiments of the present invention. First, the user may place the RFID tag 100 onto the object 200 (Step 410) such that the openings 110 are placed over the protrusions 210 on the object 200. As mentioned above, some embodiments of the RFID tag 100 can have an adhesive layer (e.g., second adhesive layer 180) on the underside of the substrate 125 of the RFID tag 100. In such embodiments, the second adhesive layer 180 will hold the RFID tag 100 in place once on the object 200. If the RFID tag 100 does not have a second adhesive layer 180 (e.g., if there are multiple pairs of openings 110 and protrusions 210), the protrusions 210 may hold the RFID tag 100 in place.

Once the RFID tag 100 is placed on the object 200 and the protrusions 210 extend through the openings 110, the user may then place the heated die 300 on the protrusions 210 (Step 420). As the heated die 300 (or a room temperature die that is subsequently heated, for example, with the induction heater discussed above) is applied to the protrusions 210, the protrusions 210 will begin to melt at the point of contact with the die 300 (Step 430). The user may then push down on the die 300 to further melt the protrusions 210 until the die 300 contacts the substrate 125. As the protrusions 210 melt, the protrusion material fills the indentation 320 in the die 300.

It is important to note that, to ensure that the RFID tag 100 is not damaged, the temperature required to melt the protrusions 210 (and the temperature of the die 300) should be below the temperature at which the RFID tag 100 may be damaged. For example, the temperature required to melt the protrusions 210 and the temperature of the die 300 should be below the melting point of the various layers of the RFID tag 100 (e.g., the substrate 125, top layer 160, etc.), and below the temperature at which the RFID chip 130 and antenna 140 may be damaged.

Any number of processes and equipment may be used to move the die 300 into place to melt the protrusions 210. For example, the die 300 may simply be a handheld die (e.g., a hand iron) that the user manually manipulates (e.g., manually puts into contact with the protrusions 210 and moves downward to melt the protrusions 210). Alternatively, the die 300 may be located on a pneumatic or hydraulic press or similar device that allows the die 300 to travel up and down (e.g., towards and away from the RFID tag 100). Furthermore, in some embodiments, the die 300 may be located on an automated press so that the melting process can be automated. It should be noted that, by melting the protrusions 210 in this manner, various embodiments of the present invention require only minimal pressures (e.g., 5-10 PSI) to form the bosses 230. Therefore, the RFID chip 130 and antenna 140 are subjected to very low stresses which, in turn, reduces the risk of damaging the RFID tag 100.

Once the protrusions 210 are fully melted and the protrusion material fills the indentation 320 within the die 300, the user may then remove the heat source, allow the die 300 to cool (Step 440), and remove the die 300 from the RFID tag 100 (Step 450). By allowing the die 300 to cool prior to removal, various embodiments of the present invention allow the melted material to begin to harden/set and the boss 230 to form. This, in turn, helps to prevent the melted material (and the newly formed boss 230) from sticking to the die 300. Additionally, it should be noted that, if the surface of the indentation 320 within the die 300 has a non-stick surface, the die 300 may be removed sooner as compared to embodiments without a non-stick coating. Therefore, the non-stick coating may reduce the overall cycle time required to form the boss(es) 230. Once the first boss 230 has been formed and the die 300 has been removed, if there are additional protrusions 210 (Step 460) the method may then repeat steps 420-450 to melt the additional protrusions and form the additional bosses 230.

It is important to note that, by utilizing boss(es) 230 to help secure the RFID tag 100 to the object 200, various embodiments of the present invention exhibit tamper resistant and tamper-evident characteristics. For example, in order to remove the RFID tag 100 from the object 200, an individual must break off the boss(es) 230 that are securing the tag 100 to the object 200. Additionally, because the boss(es) 230 (along with the material used to create them) must be broken off to remove the RFID tag 100, one cannot replace a removed RFID tag 100 with another tag 100 because there would be no material remaining to create a new boss 230. The lack of a boss 230 and/or a visibly broken-off boss 230, would be easily evident to someone inspecting the object 200. Moreover, in embodiments having hollow protrusions 210 (discussed above), the object 200 (e.g., the blood component storage container) may also be destroyed by creating holes through a portion of the object 200 (e.g., the inner cap 205).

Returning to FIG. 2, in order to further improve the tamper-resistant characteristics of the RFID tag 100, some embodiments of the present invention can have one or more weakened areas 150 within the substrate 125 of the RFID tag 100. The weakened areas 150 may act as tear initiation points during removal, and may be cuts, perforations, or similar structures within the substrate 125 that weaken the substrate 125 in the area of the cut/perforation. In this manner, when a tensile force is applied to the RFID tag 100 (e.g., during removal from the object), the tensile load will cause the substrate 125 to tear at the weakened area 150. As discussed in greater detail below, this tearing, in turn, may propagate across the antenna 140 and/or RFID chip 130, thereby destroying the RFID tag 100.

In order to ensure destruction of the RFID tag 100 during removal, it is preferable to locate the weakened areas 150 in areas that will cause the tear to propagate across the antenna 140 and the RFID chip 130. For example, the weakened areas 150 may be located within/between the various sections of the antenna 140. It is also important to note that the weakened areas 150 can extend below the antenna (e.g., such that the portion of the substrate 125 directly below the antenna is weakened) or the weakened area 150 can stop just prior to the antenna 140 and continue on the other side of the antenna 140 (e.g., such that the portion of the substrate 125 directly below the antenna 140 is not weakened/cut but the portion of the substrate 125 on either side of the antenna 140 is weakened/cut).

The weakened area(s) 150 may be strategically placed relative to the boss(es) 230. For example, the weakened area(s) 150 may be placed such that, as an individual begins to pull the tag 100 and the RFID tag 100 begins to lift off the object 200, the boss(es) 230 keep the remainder of the tag 100 firmly secured to the object. As the individual continues to pull on the RFID tag 100, the tensile load on the tag 100 will be concentrated on the weakened area(s) 150. Furthermore, because the weakened areas 150 reduce the tensile load required to tear the substrate 125 and the load required to break the boss(es) 230 or otherwise pull the RFID tag 100 off of the object 200 is greater than the load that the weakened area 150 can support, the applied tensile load will tear the substrate 125 at the weakened area.

It is also important to note that, like the weakened area 150 in the substrate 125, the antenna 140, the adhesive layers 170/180, and the top layer 160 cannot support the tensile load required to remove the tag 100 from the object 200. Therefore, the tear will propagate through the antenna 140 (and any similar conductive or semi-conductive material), the first adhesive layer 170 and the top layer 160. This, in turn, will sever the electrical connection and render the RFID tag 100 inoperable.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for securing an RFID tag to an object comprising:
   providing an RFID tag having an RFID chip and an antenna electrically connected to the RFID chip, the RFID tag also having a first and second opening extending therethrough;
   placing the RFID tag on the object, the object having a first and second protrusion extending from a surface of the object, the first and second protrusions extending through the first and second openings when the RFID tag is placed on the object; and
   melting the first and second protrusions to create a single integral boss, the boss covering at least a portion of the RFID tag, thereby securing the RFID tag to the object.

2. A method according to claim 1, wherein melting the first and second protrusions includes placing a heated die over the first and second protrusions.

3. A method according to claim 2, further comprising:
   cooling the die and boss prior to removing the die from the boss.

4. A method according to claim 2, wherein the die includes a non-stick coating, the non-stick coating preventing the boss from sticking to the die.

5. A method according to claim 1, wherein the RFID tag includes:
   a substrate, the RFID chip and antenna located on and the first and second openings passing through the substrate;
   an adhesive layer located above the substrate; and
   a top layer secured to the substrate via the adhesive layer, the top layer covering the antenna and RFID chip.

6. A method according to claim 1, wherein the RFID tag further includes:
   a second adhesive layer located on an underside of the substrate, the second adhesive layer adhering the RFID tag to the object.

7. A method according to claim 1, wherein the first opening is located on a first side of the RFID chip and the second opening is located on an opposing side of the RFID chip, such that the boss covers the RFID chip.

8. A method according to claim 1, wherein the RFID tag includes a third and fourth opening and the object includes a third and fourth protrusion, the third and fourth protrusions extending through the third and fourth openings when the RFID tag is placed on the object.

9. A method according to claim 8, further comprising:
   melting the third and fourth protrusions to create a second single integral boss, the second boss covering at least a portion of the RFID tag, thereby securing the RFID tag to the object.

10. A method according to claim 9, wherein the second boss covers at least a portion of the antenna.

11. A method according to claim 1, wherein the first and second protrusions are integral with the object.

12. A method according to claim 1, wherein RFID tag is non-functional prior to melting the first and second protrusions to create the boss.

13. A method according to claim 1, wherein removal of the boss during tampering damages the object.

14. A storage container comprising:
   a body defining the structure of the storage container;
   a first and second protrusion extending from the surface of the storage container; and
   an RFID tag configured to be secured to the surface of the storage container, the RFID tag comprising:
      a substrate having a first and second opening extending therethrough, the first and second openings configured to receive the first and second protrusions extending from the surface of the storage container, wherein the first and second protrusions are configured to be melted to create a single integral boss covering at least a portion of the RFID tag, thereby securing the RFID tag to the object,
      an RFID chip located on the substrate; and
      an antenna located on the substrate and electrically connected to the RFID chip.

15. A storage container according to claim 14, wherein the first and second protrusions are configured to be melted using a heated die.

16. A storage container according to claim 15, wherein the die includes a non-stick coating, the non-stick coating preventing the boss from sticking to the die.

17. A storage container according to claim 14, wherein the RFID tag further includes:
   an adhesive layer located on an underside of the substrate, the adhesive layer adhering the RFID tag to the object.

18. A storage container according to claim 14, wherein the RFID tag further includes:
   an adhesive layer located above the substrate; and
   a top layer secured to the substrate via the adhesive layer, the top layer covering the antenna and RFID chip.

19. A storage container according to claim 14, wherein the first and second openings are located on opposite sides of the RFID chip, such that the boss covers the RFID chip.

20. A storage container according to claim 14, wherein the RFID tag includes a third and fourth opening, and the storage container includes a third and fourth protrusion extending from the surface, the third and fourth protrusions extending through the third and fourth openings when the RFID tag is placed on the object.

21. A storage container according to claim 20, wherein the third and fourth protrusions are configured to be melted to create a second single integral boss, the second boss covering at least a portion of the RFID tag, thereby further securing the RFID tag to the object.

22. A storage container according to claim 21, wherein the second boss covers at least a portion of the antenna.

23. A storage container according to claim 14, wherein the first and second protrusions are integral with the object.

24. A storage container according to claim 14, wherein the RFID tag is non-functional prior to melting the first and second protrusions to create the boss.

25. A storage container according to claim 14, wherein removal of the boss during tampering damages the storage container.

26. A system for securing an RFID tag to an object comprising:
   an RFID tag having a substrate with a first and second opening extending therethrough;
   an RFID chip located on the substrate;
   an antenna located on the substrate and electrically connected to the RFID chip; and
   a first and second protrusion extending from a surface of the object, the first and second protrusions configured to extend through the first and second openings when the RFID tag is placed on the object, the first and second protrusions configured to be melted to create a single integral boss, the boss covering at least a portion of the RFID tag, thereby securing the RFID tag to the object.

27. A system according to claim 26, wherein the first and second protrusions are configured to be melted using a heated die.

28. A system according to claim 27, wherein the die includes a non-stick coating, the non-stick coating preventing the boss from sticking to the die.

29. A system according to claim 26, the RFID tag further including:
   an adhesive layer located on an underside of the substrate, the adhesive layer adhering the RFID tag to the object.

30. A system according to claim 26, the RFID tag further including:
   an adhesive layer located above the substrate; and
   a top layer secured to the substrate via the adhesive layer, the top layer covering the antenna and RFID chip.

31. A system according to claim 26, wherein the first and second openings are located on opposite sides of the RFID chip, such that the boss covers the RFID chip.

32. A system according to claim 26, wherein the RFID tag includes third and fourth openings configured to receive third and fourth protrusions extending from the surface, the third and fourth protrusions extending through the third and fourth openings when the RFID tag is placed on the object.

33. A system according to claim 32, wherein the of third and fourth protrusions are configured to be melted to create a second single integral boss, the second boss covering at least a portion of the RFID tag, thereby further securing the RFID tag to the object.

34. A system according to claim 33, wherein the second boss covers at least a portion of the antenna.

35. A system according to claim 26, wherein the first and second protrusions are integral with the object.

36. A system according to claim 26, wherein the RFID tag is non-functional prior to melting the first and second protrusions to create the boss.

37. A system according to claim 26, wherein removal of the boss during tampering damages the object.

* * * * *

UNITED STATES PATENT AND TRADEMARK OFFICE
CERTIFICATE OF CORRECTION

Page 1 of 1

PATENT NO. : 9,928,457 B2
APPLICATION NO. : 14/896224
DATED : March 27, 2018
INVENTOR(S) : Christopher S. McDowell It is certified that error appears in the above-identified patent and that said Letters Patent is hereby corrected as shown below:

In the Claims

In Column 12, Line 20:
Replace "the of third"
With "the third"

Signed and Sealed this
Twenty-fourth Day of July, 2018

Andrei Iancu
*Director of the United States Patent and Trademark Office*